United States Patent
Sukiman et al.

(10) Patent No.: US 7,367,046 B1
(45) Date of Patent: Apr. 29, 2008

(54) METHOD AND APPARATUS FOR ASSIGNING NETWORK ADDRESSES TO NETWORK DEVICES

(75) Inventors: Indrajanti Sukiman, Sunnyvale, CA (US); Gautam Aggarwal, San Jose, CA (US); William C. Melohn, Cupertino, CA (US); Siva S. Jayasenan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 816 days.

(21) Appl. No.: 10/310,372

(22) Filed: Dec. 4, 2002

(51) Int. Cl.
*G06F 21/00* (2006.01)

(52) U.S. Cl. .................. 726/2; 726/3; 726/4; 713/155; 709/219; 709/245

(58) Field of Classification Search ................ 713/155; 709/219, 245; 726/2–4
See application file for complete search history.

(56) References Cited

U.S. PATENT DOCUMENTS

| | | |
|---|---|---|
| 6,510,154 B1 | 1/2003 | Mayes et al. |
| 6,522,880 B1 | 2/2003 | Verma et al. |
| 6,526,452 B1 | 2/2003 | Petersen et al. |
| 6,748,439 B1 * | 6/2004 | Monachello et al. ....... 709/229 |
| 6,772,347 B1 * | 8/2004 | Xie et al. ..................... 726/11 |
| 6,865,673 B1 * | 3/2005 | Nessett et al. .............. 713/155 |
| 6,870,845 B1 * | 3/2005 | Bellovin et al. ............ 370/392 |
| 6,892,245 B1 * | 5/2005 | Crump et al. ............... 709/245 |
| 6,938,155 B2 * | 8/2005 | D'Sa et al. ................. 713/160 |
| 6,965,939 B2 * | 11/2005 | Cuomo et al. .............. 709/229 |
| 7,194,554 B1 * | 3/2007 | Short et al. ................. 709/246 |

* cited by examiner

*Primary Examiner*—Nasser Moazzami
*Assistant Examiner*—Tongoc Tran
(74) *Attorney, Agent, or Firm*—Hickman Palermo Truong & Becker LLP

(57) ABSTRACT

According to an approach for assigning network addresses to network devices, an authentication request that requests authentication of identification data that uniquely identifies a network device is generated and sent to an authentication mechanism. An authentication response is received from the authentication mechanism that indicates whether the network device is authorized to access a first network. If the authentication response indicates that the network device is authorized to access the first network, then a first network address on a first network is assigned to the network device. If the authentication response indicates that the network device is not authorized to access the first network, then a second network address on a second network to the network device is assigned. If no authentication response is received from the authentication mechanism, then the second network address on the second network is assigned to the network device.

47 Claims, 4 Drawing Sheets

US 7,367,046 B1

METHOD AND APPARATUS FOR ASSIGNING NETWORK ADDRESSES TO NETWORK DEVICES

FIELD OF THE INVENTION

The present invention generally relates to management of computer networks. The invention relates more specifically to a method and apparatus for assigning network addresses to network devices.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many companies have a desire to provide remote access to their private computer intranets. By permitting remote access, users can connect to the company's computer intranet to work and obtain resource information while located at a remote site. A drawback associated with providing remote access to a company's private computer intranet is that unauthorized users may sometimes gain access to the network system, thus potentially allowing the company's resources and information to be accessed, used or compromised.

One approach to prevent unauthorized access to a company's private intranet is to limit access to only specific "trusted" network devices. For example, an address allocator located in customer premises equipment (CPE) may control the allocation of Internet protocol (IP) addresses to network devices such that "trusted" network devices are assigned an address from a "trusted" pool of network addresses, while "untrusted" network devices are assigned addresses from an "untrusted" pool of network addresses. In order to determine whether a network device should be allocated an address from the trusted pool, the client ID, which uniquely identifies the network device, may be authenticated locally in the CPE by comparing the client ID to a statically configured list of trusted client ID's.

A drawback to the above approach is that the trusted client ID list is statically configured, and therefore any change to this list requires a configuration change on the local CPE. Further, this approach does not prevent a network device with a static IP address in the secure address range from accessing the private company intranet.

Based on the foregoing, there is a clear need for a method for assigning network addresses to network devices in which authentication of a client ID is performed by an external, centrally located entity, which is easily configured by a central administrator.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for assigning network addresses to network devices is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
   2.0 Network Address Assignment Architecture
   3.0 Assigning Network Addresses to Network Devices
   4.0 Implementation Mechanisms
   5.0 Extensions and Alternatives

1.0 OVERVIEW

An approach for assigning network addresses to network devices includes generating an authentication request that requests authentication of identification data that uniquely identifies a network device. The authentication request is sent to an authentication mechanism. An authentication response is received from the authentication mechanism that indicates whether the network device is authorized to access a first network. If the authentication response indicates that the network device is authorized to access the first network, then a first network address on a first network is assigned to the network device. If the authentication response indicates that the network device is not authorized to access the first network, then a second network address on a second network to the network device is assigned. According to another embodiment, if no authentication response is received from the authentication mechanism, then the second network address on the second network is assigned to the network device.

Other embodiments include generating an authentication request in response to receiving, from the network device, a request for a network address, and sending the authentication request to the authentication mechanism via a secure connection.

2.0 NETWORK ADDRESS ASSIGNMENT ARCHITECTURE

Figure 1:
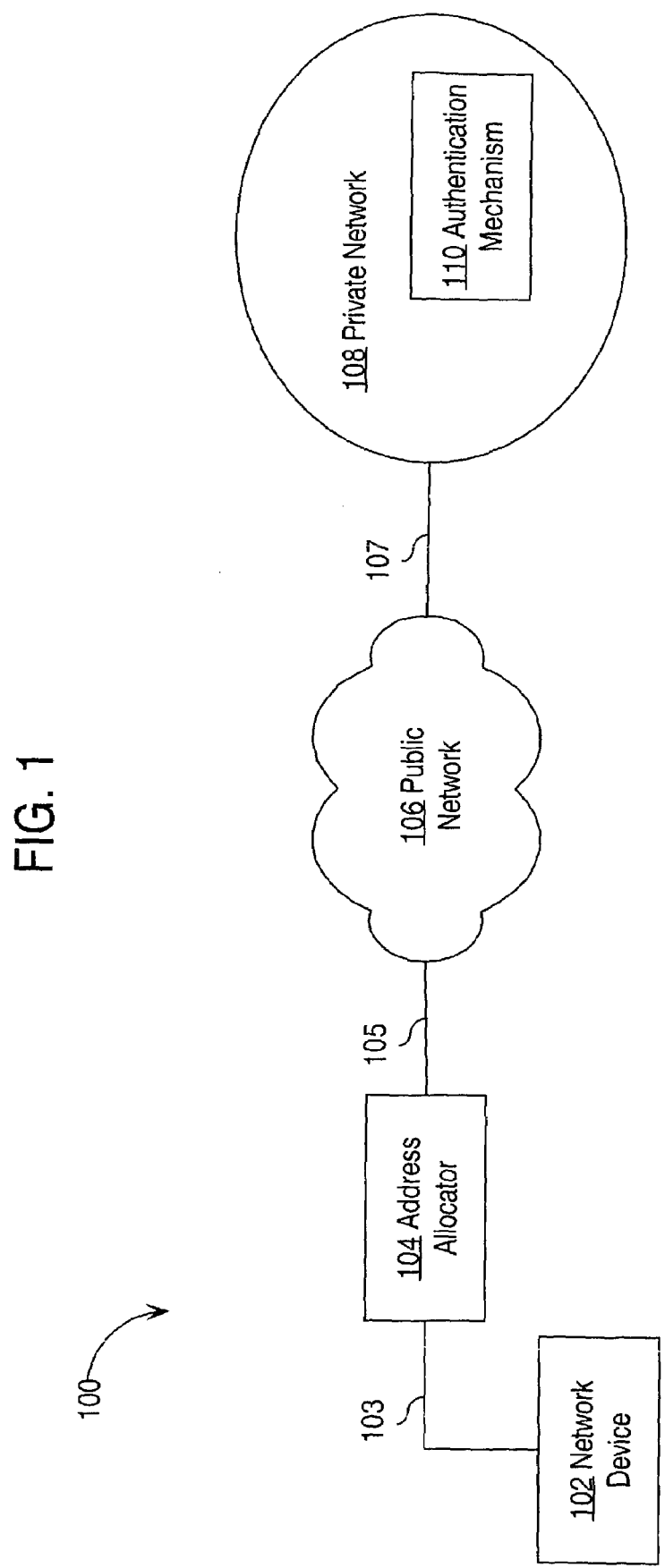
FIG. 1 is a block diagram that illustrates an arrangement for assigning network addresses to network devices according to one embodiment.

FIG. 1 is a block diagram illustrating an arrangement 100 for assigning network addresses to network devices according to one embodiment. Arrangement 100 includes a network device 102, an address allocator 104, a public network 106, a private network 108, and an authentication mechanism 110 that are interconnected by communications links 103, 105 and 107, respectively. Communications links 103, 105 and 107 may be implemented by any medium or mechanism that provides for the exchange of data between network elements. Examples of communications links 103, 105 and 107 include, without limitation, a network such as a Local Area Network (LAN), Wide Area Network (WAN), Ethernet or the Internet, or one or more terrestrial, satellite or wireless links. Communications links 103, 105 and 107 may be secure, depending upon the requirements of a particular application.

Network device 102 is communicatively coupled to address allocator 104 by communications link 103. Examples of network devices include, without feature, personal computers, Internet protocol phones, and wireless devices. In FIG. 1, for purposes of illustrating a clear example, only one network device 102 and address allocator 104 are illustrated. Embodiments, however, are applicable to any number of network devices and address allocators, and multiple connections may be used to connect network device 102 to address allocator 104.

Address allocator 104 may be implemented by a computer, or a group of hardware or software components and/or processes that cooperate or execute in one or more computer systems. In one embodiment, address allocator 104 is implemented in a Dynamic Host Control Protocol (DHCP) server that contains a pool of Internet protocol (IP) logical network addresses (IP addresses) available for responding to process requests from a DHCP client. In this context, network device 102 includes a DHCP client. In one embodiment, the DHCP server is disposed within customer premises equipment (CPE), including, but not limited to, a personal computer, workstation, or Internet protocol phone. In another embodiment, the DHCP server is disposed external to CPE.

Address allocator 104 is communicatively coupled to public network 106 by communications link 105. In one embodiment, the accessibility of public network 106 is less restricted relative to private network 108. For example, public network 106 is the global packet-switched internetworks collectively known as the Internet.

Public network 106 is communicatively coupled to private network 108 by communications link 107. In one embodiment, the accessibility of private network 108 is more restricted relative to public network 106. For example, private network 108 may be a corporate intranet.

Authentication mechanism 110 is configured to determine whether a particular network device 102 is authorized to access private network 108. An example of authentication mechanism 110 is an authentication, authorization and accounting ("AAA") server. Although authentication mechanism 110 is illustrated as being disposed within private network 108, authentication mechanism 110 may be disposed external to private network 108, depending on the requirements of a particular application.

3.0 ASSIGING NETWORK ADDRESSES TO NETWORK DEVICES

Figure 2:
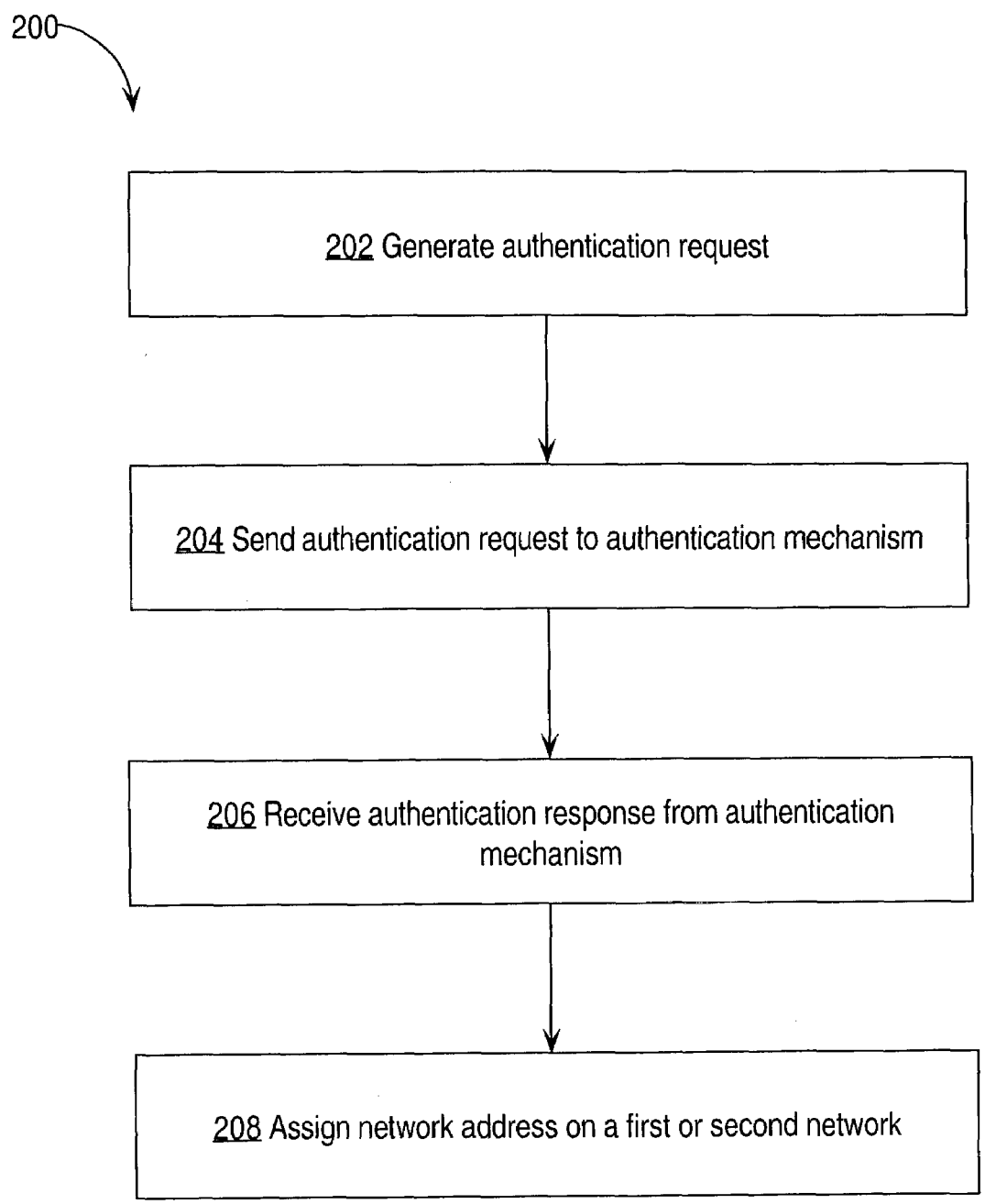
FIG. 2 is a flow diagram that illustrates a method for assigning network addresses to network devices.

FIG. 2 is a flow diagram that illustrates one embodiment of a method for assigning network addresses to network devices. For purposes of illustrating a clear example, the method of FIG. 2 is described herein with reference to arrangement 100 of FIG. 1. However, the method of FIG. 2 is not limited to arrangement 100.

In block 202, an authentication request that requests authentication of identification data that uniquely identifies network device 102 is generated. Examples of identification data include, without limitation, Media Access Control (MAC) addresses, device hostnames and American Standard Code for Information Interchange (ASCII) strings unique to network devices. In one embodiment, a DHCP server generates an authentication request that requests authentication of a MAC address of network device 102.

In one embodiment, address allocator 104 generates the authentication request in response to receiving from network device 102, a request for a network address, which includes the identification data. In this context, the network address is an Internet protocol address. In one specific embodiment, a DHCP server receives a process request from a DHCP client included in network device 102. The process request includes the MAC address of network device 102.

In block 204, the authentication request is sent to authentication mechanism 110. In one embodiment, the authentication request is sent to authentication mechanism 110 via a virtual private network (VPN) through public network 106 and secure communications links. For example, communications links 105 and 107 may conform to Internet Protocol Security (IPsec) or Secure Sockets Layer (SSL) protocols, depending upon the requirements of a particular application.

Authentication mechanism 110 authenticates the identification data by determining whether network device 102 is authorized to access private network 108. For example, authentication mechanism 110 compares the MAC address of network device 102 contained in the authentication request to a set of MAC addresses stored on authentication mechanism 110. An administrator may add, remove or update the MAC addresses in authentication mechanism 110 based on changes to user accessibility privileges.

Authentication mechanism 110 then generates an authentication response that indicates whether the identification data has been authenticated, and therefore whether network device 102 is authorized to access private network 108. Authentication mechanism sends the authentication response to address allocator 104.

In one embodiment, the authentication response received from the authentication mechanism 110 indicates "Authenticated", "Not Authenticated" or "Rejected". In this context, an "Authenticated" response indicates network device 102 is authorized to access a first network based on verification of the identification data by authentication mechanism 110. A "Not Authenticated" response indicates that network device 102 is not authorized to access a first network based on verification of the identification data by authentication mechanism 110. A "Rejected" response indicates that the authentication request was rejected or otherwise not able to be processed by authentication mechanism 110, and network device 102 is therefore not authorized to access a first network.

In block 206, an authentication response is received from authentication mechanism 110. In block 208, a network address is assigned to network device 102 based upon the authentication response received from authentication mechanism 110. In one embodiment, accessibility to the first network is more restricted relative to the second network. For example, the first network may be private network 108 and the second network may be public network 106. In one embodiment, if the authentication response indicates that network device 102 is authorized to access a first network, then address allocator 104 assigns a network address from a "trusted" pool of network addresses. The trusted pool of network addresses may be stored internal or external to address allocator 104. In this context, "trusted" refers to addresses that permit access to the first network. If the authentication response indicates that network device 102 is not authorized to access the first network, then address allocator 104 assigns an network address from an "untrusted" pool of network addresses stored in the address allocator. In this context, "untrusted" refers to addresses that permit access to the second network.

In one embodiment, address allocator 104 is configured with an access control list (ACL) for managing the trusted pool of network addresses. For example, the ACL may contain trusted pool network addresses that are available to be assigned to network devices that are properly authorized.

Figure 3:
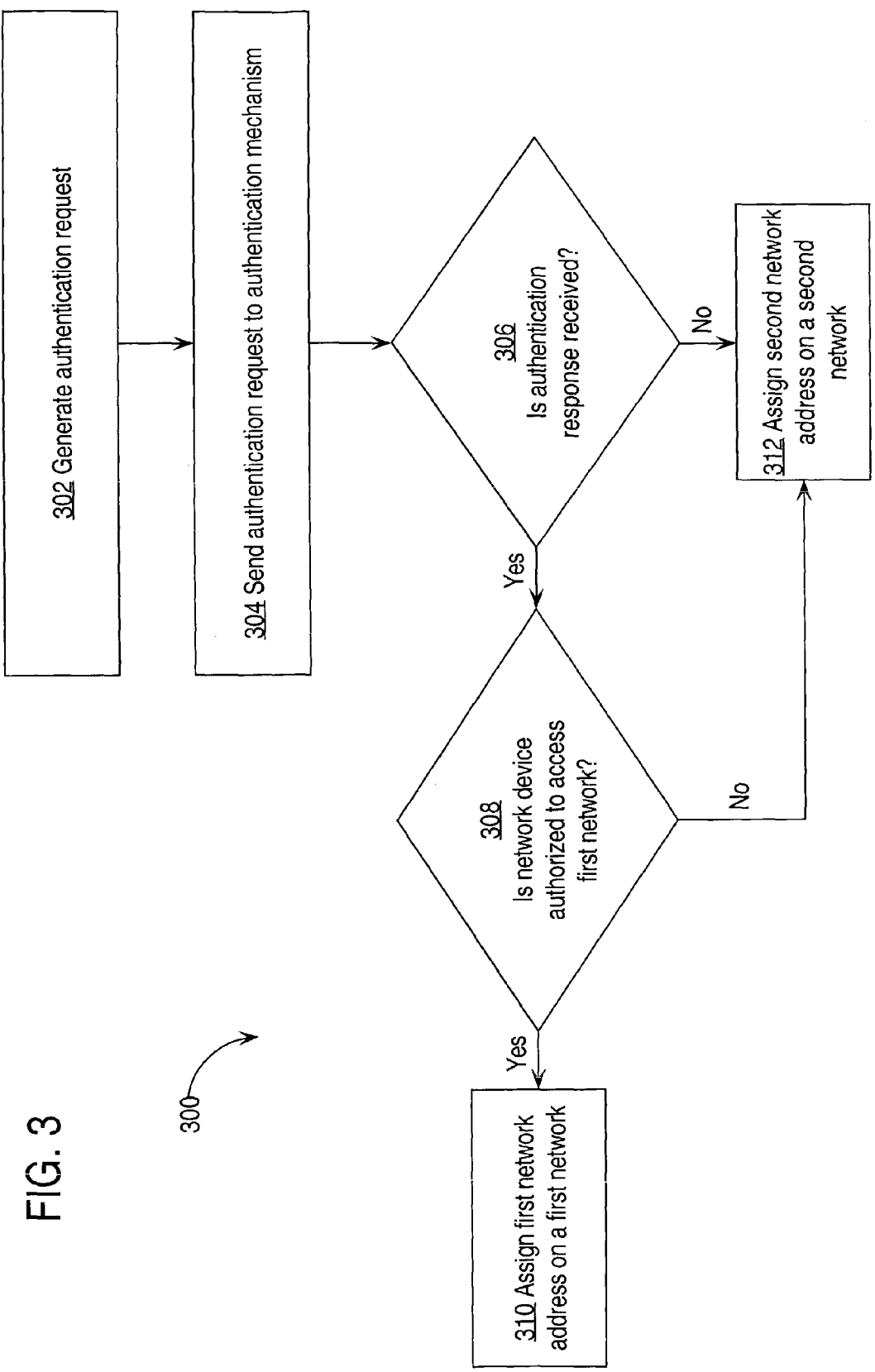
FIG. 3 is a flow diagram that illustrates another embodiment of a method of assigning network addresses to network devices.

FIG. 3 is a flow diagram of another embodiment of a method of assigning network addresses to network devices. In block 302, an authentication request is generated that requests authentication of identification data that uniquely identifies network device 102. In block 304, the authentication request is sent to authentication mechanism 110.

In block 306, a determination is made whether an authentication response is received from authentication mechanism 110. In block 308, if an authentication response is received from authentication mechanism 110, a determination is made whether network device 102 is authorized to access the first network.

If network device 102 is authorized to access a first network, then in block 310, a first network address is assigned to network device 102 from the first network. If network device 102 is not authorized to access a first network, then in block 312, a second network address is assigned to network device 102 from a second network. If in block 306, an authentication response is not received from authentication mechanism 110, then the second network address is assigned on a second network.

4.0 IMPLEMENTATION MECHANISMS

Figure 4:
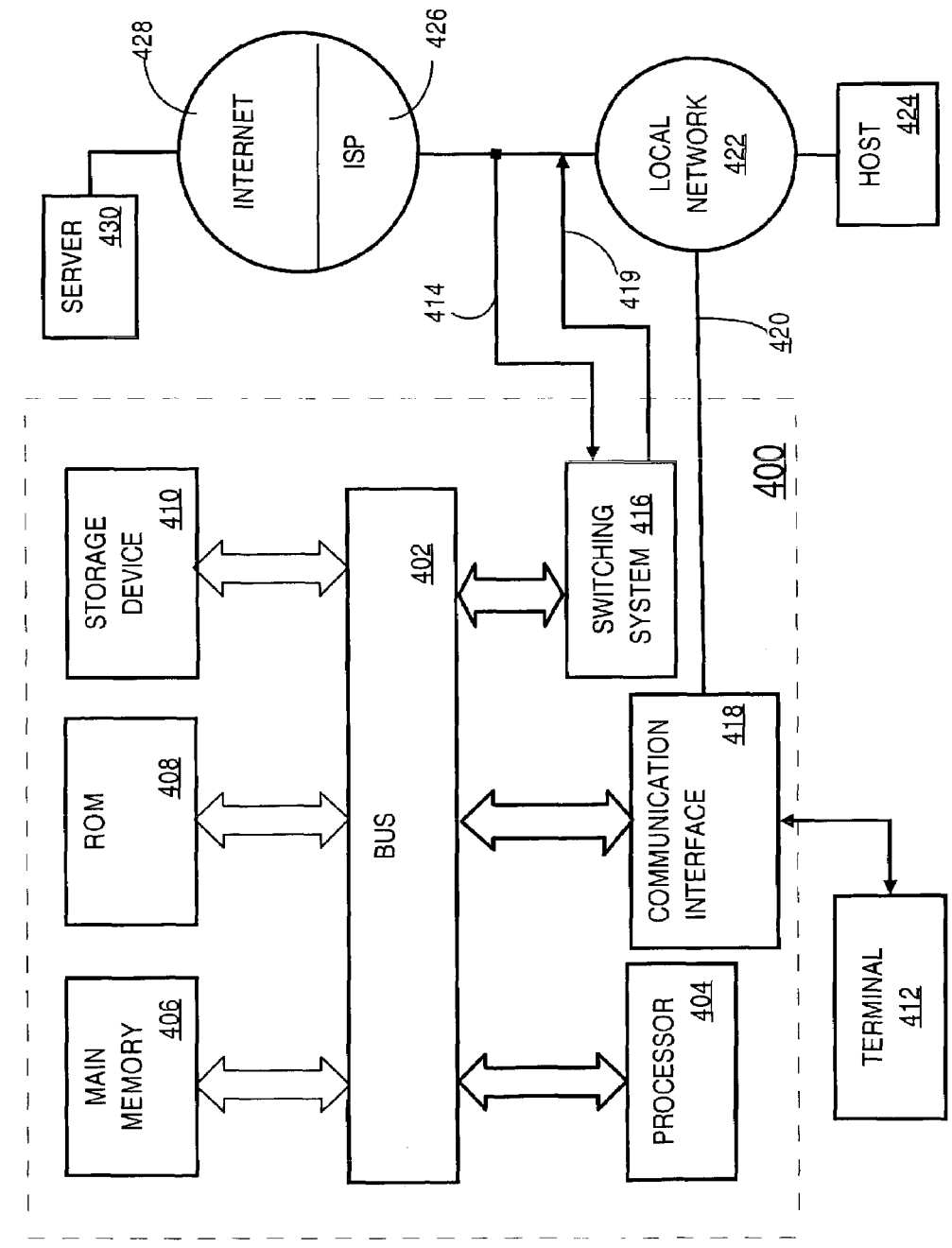
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for assigning network addresses to network devices. According to one embodiment of the invention, the assigning of network addresses to network devices is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams.

The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for assigning network addresses to network devices as described herein.

The received code may be executed by processor 404 as it is received, and/or stored in storage device 410, or other non-volatile storage for later execution. In this manner, computer system 400 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for assigning network addresses to network devices, the method comprising the computer-implemented steps of:
   receiving an address allocation request from a client network device that does not have an assigned network address;
   generating a network device authentication request that requests authentication of identification data that uniquely identifies the network device;
   sending the authentication request to an authentication mechanism;
   wherein the authentication mechanism comprises an authentication, authorization and accounting (AAA) server;
   receiving an authentication response from the authentication mechanism;
   if the authentication response indicates that the network device is authorized to access a first network, then assigning to the network device, a trusted network address on the first network, and
   if the authentication response indicates that the network device is not authorized to access a first network, then assigning to the network device, an untrusted network address on a second network;
   wherein the trusted and untrusted network addresses are assigned to the network device without respect to port assignment;
   wherein the generating, the sending and the receiving the authentication response all are performed in response to receiving the address allocation request.

2. A method as recited in claim 1, wherein the step of generating an authentication request is performed in response to receiving, from the network device, a request for a network address, wherein the request includes the identification data.

3. A method as recited in claim 1, wherein said network device is one or more of a personal computer, an Internet Protocol phone and a wireless device.

4. A method as recited in claim 1, wherein said trusted network address is an Internet protocol address.

5. A method as recited in claim 1, wherein said identification data is a media access control (MAC) address.

6. A method as recited in claim 1, wherein the step of sending the authentication request to the authentication mechanism is performed via a secure connection.

7. A method as recited in claim 6, wherein said secure connection conforms to Internet Protocol Security (IPsec) or Secure Sockets Layer (SSL) protocols.

8. A method as recited in claim 1, wherein accessibility to the first network is more restricted relative to the second network.

9. A method as recited in claim 8, wherein the first network is a private network and the second network is a public network.

10. A method as recited in claim 9, wherein the private network is a corporate intranet and the public network is the Internet.

11. A method for assigning network addresses to network devices, the method comprising the computer-implemented steps of:
    receiving an address allocation request from a client network device that does not have an assigned network address;
    generating a network device authentication request that requests authentication of identification data that uniquely identifies the network device;
    sending the authentication request to an authentication mechanism;
    wherein the authentication mechanism comprises an authentication, authorization and accounting (AAA) server;
    determining whether an authentication response is received from the authentication mechanism;
    if the authentication response is received from the authentication mechanism, then determining whether the authentication response indicates the network device is authorized to access a first network;
    if the authentication response indicates that the network device is authorized to access the first network, then assigning, to the network device, a trusted network address on the first network;
    if the authentication response indicates that the network device is not authorized to access the first network, then assigning, to the network device, an untrusted network address on a second network; and
    if the authentication response is not received from the authentication mechanism, then assigning, to the network device, an untrusted network address on the second network;
    wherein the trusted and untrusted network addresses are assigned to the network device without respect to port assignment;
    wherein the generating, the sending and the determining all are performed in response to receiving the address allocation request.

12. A computer-readable storage medium carrying one or more sequences of instructions for assigning addresses to network devices, which instructions, when executed by one or more processors, cause the one or more processors to carry out the steps of:
    receiving an address allocation request from a client network device that does not have an assigned network address;

generating a network device authentication request that requests authentication of identification data that uniquely identifies the network device;

sending the authentication request to an authentication mechanism;

wherein the authentication mechanism comprises an authentication, authorization and accounting (AAA) server;

receiving an authentication response from the authentication mechanism;

if the authentication response indicates that the network device is authorized to access a first network, then assigning, to the network device, a trusted network address on the first network, and if the authentication response indicates that the network device is not authorized to access the first network, then assigning, to the network device, an untrusted network address on the second network;

wherein the trusted and untrusted network addresses are assigned to the network device without respect to port assignment;

wherein the generating, the sending and the receiving the authentication response all are performed in response to receiving the address allocation request.

13. The computer-readable storage medium as recited in claim 12, wherein the step of generating an authentication request is performed in response to receiving, from the network device, a request for a network address, wherein the request includes the identification data.

14. The computer-readable storage medium as recited in claim 12, wherein said network device is one or more of a personal computer, an Internet Protocol phone and a wireless device.

15. The computer-readable storage medium as recited in claim 12, wherein said trusted network address is an Internet protocol address.

16. The computer-readable storage medium as recited in claim 12, wherein said identification data is a media access control (MAC) address.

17. The computer-readable storage medium as recited in claim 12, wherein the step of sending the authentication request to the authentication mechanism is performed via a secure connection.

18. The computer-readable storage medium as recited in claim 17, wherein said secure connection conforms to Internet Protocol Security (IPsec) or Secure Sockets Layer (SSL) protocols.

19. The computer-readable storage medium as recited in claim 12, wherein accessibility to the first network is more restricted relative to the second network.

20. The computer-readable storage medium as recited in claim 19, wherein the first network is a private network and the second network is a public network.

21. The computer-readable storage medium as recited in claim 20, wherein the private network is a corporate intranet and the public network is the Internet.

22. A computer-readable storage medium carrying one or more sequences of instructions for assigning network addresses to devices, which instructions, when executed by one or more processors, cause the one or more processors to carry out the steps of:

receiving an address allocation request from a client network device that does not have an assigned network address;

generating a network device authentication request that requests authentication of identification data that uniquely identifies the network device;

sending the authentication request to an authentication mechanism;

wherein the authentication mechanism comprises an authentication, authorization and accounting (AAA) server;

determining whether an authentication response is received from the authentication mechanism;

if the authentication response is received from the authentication mechanism, then determining whether the authentication response indicates the network device is authorized to access a first network;

if the authentication response indicates that the network device is authorized to access the first network, then assigning, to the network device, a trusted network address on the first network;

if the authentication response indicates that the network device is not authorized to access the first network, then assigning, to the network device, an untrusted network address on a second network; and if the authentication response is not received from the authentication mechanism, then assigning, to the network device, a an untrusted network address on the second network;

wherein the trusted and untrusted network addresses are assigned to the network device without respect to port assignment;

wherein the generating, the sending and the determining all are performed in response to receiving the address allocation request.

23. An apparatus for assigning network addresses to network devices, comprising:

means for receiving an address allocation request from a client network device that does not have an assigned network address;

means for generating a network device authentication request that requests authentication of identification data that uniquely identifies the network device;

means for sending the authentication request to an authentication mechanism;

means for determining whether an authentication response is received from the authentication mechanism;

wherein the authentication mechanism comprises an authentication, authorization and accounting (AAA) server;means for determining if the authentication response is received from the authentication mechanism and for determining whether the authentication response indicates the network device is authorized to access a first network;

means for assigning, to the network device, a trusted network address on the first network if the authentication response indicates that the network device is authorized to access a first network;

means for assigning, to the network device, an untrusted network address on a second network if the authentication response indicates that the network device is not authorized to access a first network;

means for assigning, to the network device, an untrusted network address on the second network if the authentication response is not received from the authentication mechanism;

wherein the means for assigning the trusted and untrusted network addresses to the network device is performed without respect to port assignment;

wherein the means for generating, sending and determining all are performed in response to receiving the address allocation request.

24. An apparatus for assigning network addresses to network devices comprising
- a memory having one or more stored sequences of instructions which, when executed by one or more processors, cause the one or more processors to:
- receive an address allocation request from a client network device that does not have an assigned network address;
- generate a network device authentication request that requests authentication of identification data that uniquely identifies the network device;
- send the authentication request to an authentication mechanism;
- wherein the authentication mechanism comprises an authentication, authorization and accounting (AAA) server;
- determine whether an authentication response is received from the authentication mechanism;
- if the authentication response is received from the authentication mechanism, then determine whether the authentication response indicates the network device is authorized to access a first network;
- if the authentication response indicates that the network device is authorized to access the first network, then assign, to the network device, a trusted network address on the first network;
- if the authentication response indicates that the network device is not authorized to access the first network, then assign, to the network device, an untrusted network address on a second network;
- if the authentication response is not received from the authentication mechanism, then assign, to the network device, an untrusted network address on the second network;
- wherein the trusted and untrusted network addresses are assigned to the network device without respect to port assignment;
- wherein the instructions to generate, send and receive an authentication response all are responsive to the instructions to receive the address allocation request.

25. An apparatus for assigning network addresses to network devices, comprising:
- means for receiving an address allocation request from a client network device that does not have an assigned network address;
- means for generating a network device authentication request that requests authentication of identification data that uniquely identifies a network device;
- means for sending the authentication request to an authentication mechanism;
- means for receiving an authentication response from the authentication mechanism;
- means for assigning, to the network device, a trusted network address on the first network if the authentication response indicates that the network device is authorized to access the first network, and
- means for assigning, to the network device, an untrusted network address on a second network if the authentication response indicates that the network device is not authorized to access the first network;
- wherein the means for assigning the trusted and untrusted network addresses to the network device by is performed by a network address allocator;
- wherein the means for generating, sending and receiving the authentication response all are responsive to the means for receiving the address allocation request.

26. An apparatus as recited in claim 25, wherein the means for generating an authentication request is configured to generate the authentication request in response to receiving, from the network device, a request for a network address, wherein the request includes the identification data.

27. An apparatus as recited in claim 25, wherein said network device is one or more of a personal computer, an Internet Protocol phone and a wireless device.

28. An apparatus as recited in claim 25, wherein said trusted network address is an Internet protocol address.

29. An apparatus as recited in claim 25, wherein said identification data is a media access control (MAC) address.

30. An apparatus as recited in claim 25, wherein the means for sending the authentication request to the authentication mechanism is configured to send the authentication request to the authentication mechanism via a secure connection.

31. An apparatus as recited in claim 30, wherein said secure connection conforms to Internet Protocol Security (IPsec) or Secure Sockets Layer (SSL) protocols.

32. An apparatus as recited in claim 25, wherein accessibility to the first network is more restricted relative to the second network.

33. An apparatus as recited in claim 32, wherein the first network is a private network and the second network is a public network.

34. An apparatus as recited in claim 33, wherein the private network is a corporate intranet and the public network is the Internet.

35. The apparatus of claim 25, wherein the apparatus comprises a DHCP server and wherein the AAA server is in another private network separate from the first network and the second network.

36. An apparatus for assigning network addresses to network devices comprising:
- a memory having one or more stored sequences of instructions which, when executed by one or more processors, cause the one or more processors to:
- receive an address allocation request from a client network device that does not have an assigned network address;
- generate a network device authentication request that requests authentication of identification data that uniquely identifies the network device;
- send the authentication request to an authentication mechanism;
- wherein the authentication mechanism comprises an authentication, authorization and accounting (AAA) server;
- receive an authentication response from the authentication mechanism;
- if the authentication response indicates that the network device is authorized to access a first network, then assign, to the network device, a trusted network address on the first network, and
- if the authentication response indicates that the network device is not authorized to access the first network, then assign, to the network device, an untrusted network address on the second network;
- wherein the trusted and untrusted network addresses are assigned to the network device without respect to port assignment;
- wherein the instructions to generate, send and receive an authentication response all are performed in response to the instructions to receive the address allocation request.

37. An apparatus as recited in claim 36, wherein the generating an authentication request is performed in response to receiving, from the network device, a request for a network address, wherein the request includes the identification data.

38. An apparatus as recited in claim 36, wherein said network device is one or more of a personal computer, an Internet Protocol phone and a wireless device.

39. An apparatus as recited in claim 36, wherein said trusted network address is an Internet protocol address.

40. An apparatus as recited in claim 36, wherein said identification data is a media access control (MAC) address.

41. An apparatus as recited in claim 36, wherein the sending the authentication request to the authentication mechanism is performed via a secure connection.

42. An apparatus as recited in claim 41, wherein said secure connection conforms to Internet Protocol Security (IPsec) or Secure Sockets Layer (SSL) protocols.

43. An apparatus as recited in claim 36, wherein accessibility to the first network is more restricted relative to the second network.

44. An apparatus as recited in claim 43, wherein the first network is a private network and the second network is a public network.

45. An apparatus as recited in claim 44, wherein the private network is a corporate intranet and the public network is the Internet.

46. The method of claim 1, wherein a DHCP server performs all the steps and wherein the AAA server is in another private network separate from the first network and the second network.

47. The apparatus of claim 36, wherein the apparatus comprises a DHCP server and wherein the AAA server is in another private network separate from the first network and the second network.

* * * * *